United States Patent
Suteerawanit (10) Patent No.: US 11,937,593 B1
(45) Date of Patent: Mar. 26, 2024

(54) GERMAN COCKROACH GLUE TRAP

(71) Applicant: Nick Suteerawanit, Los Angeles, CA (US)

(72) Inventor: Nick Suteerawanit, Los Angeles, CA (US)

( * ) Notice: Subject to any disclaimer, the term of this patent is extended or adjusted under 35 U.S.C. 154(b) by 0 days.

(21) Appl. No.: 18/204,825

(22) Filed: Jun. 1, 2023

(51) Int. Cl.
*A01M 1/14* (2006.01)
*A01M 1/10* (2006.01)
*A01M 1/16* (2006.01)

(52) U.S. Cl.
CPC .............. *A01M 1/14* (2013.01); *A01M 1/103* (2013.01); *A01M 1/16* (2013.01)

(58) Field of Classification Search
CPC .......... A01M 1/103; A01M 1/10; A01M 1/14; A01M 1/145; A01M 1/00; A01M 1/02
USPC ............................ 43/121, 114, 107; 220/802
See application file for complete search history.

(56) References Cited

U.S. PATENT DOCUMENTS

| | | | | | |
|---|---|---|---|---|---|
| 529,109 | A | * | 11/1894 | Burgess ................ | A01M 1/103 43/121 |
| 544,183 | A | * | 8/1895 | Marchese ............. | A01M 1/103 43/121 |
| 554,616 | A | * | 2/1896 | Cook .............................. | 43/121 |
| 812,761 | A | * | 2/1906 | Meier ............................... | 43/65 |
| 868,514 | A | * | 10/1907 | Westerbeck ......... | B65D 43/022 220/802 |
| 1,134,318 | A | * | 4/1915 | Deardoff ......................... | 43/121 |
| 1,161,388 | A | * | 11/1915 | Johnson ................ | A01M 1/103 43/115 |
| 1,485,867 | A | * | 3/1924 | Mooney .................... | A01M 1/02 43/121 |
| 2,000,193 | A | * | 5/1935 | Schroder ............... | A01M 1/106 43/121 |
| 2,695,115 | A | * | 11/1954 | Roop .................. | B65D 21/0219 206/508 |
| 2,752,970 | A | * | 7/1956 | Tupper ..................... | B65D 1/42 220/802 |
| 3,023,539 | A | * | 3/1962 | Emerson, Jr. ......... | A01M 1/145 43/113 |
| 3,355,056 | A | * | 11/1967 | Fisch .................. | B65D 43/0218 220/802 |
| 3,802,116 | A | * | 4/1974 | Meguro .................. | A01M 1/02 43/121 |
| 3,816,956 | A | * | 6/1974 | Sekula .................... | A01M 1/14 43/114 |

(Continued)

FOREIGN PATENT DOCUMENTS

CA 2324586 A1 * 4/2002 ............. A01M 1/14
DE 2323514 A1 * 12/1973

(Continued)

*Primary Examiner* — Darren W Ark
(74) *Attorney, Agent, or Firm* — Averill, Green & Kim; Philip Y Kim; Kenneth L Green (57) ABSTRACT

A German cockroach glue trap comprising a dark colored base having an overall height between 15 mm and 30 mm; multitude of equidistant openings around said base and said openings having a diameter between 3.5 mm and 4.5 mm. The centers of said openings having heights preferably between 7 mm and 9 mm. The openings are large enough for German cockroaches but not too large to let in too much light. Said glue trap also comprising a lid having a tapered bottom layer that fits tightly to said base when in the closed position.

2 Claims, 5 Drawing Sheets

(56) References Cited

U.S. PATENT DOCUMENTS

| | | | | |
|---|---|---|---|---|
| 3,851,417 A * | 12/1974 | Wunsche | ............... | A01M 1/02 43/121 |
| 3,908,302 A * | 9/1975 | Carr | ............... | A01M 1/02 43/121 |
| 3,913,259 A * | 10/1975 | Nishimura | ............... | A01M 1/02 43/121 |
| 3,940,874 A * | 3/1976 | Katsuda | ............... | A01M 1/14 43/114 |
| 4,030,233 A * | 6/1977 | Wunsche | ............... | A01M 1/103 43/121 |
| 4,044,495 A * | 8/1977 | Nishimura | ............... | A01M 1/14 43/121 |
| 4,208,828 A * | 6/1980 | Hall | ............... | A01M 1/02 43/121 |
| 4,214,400 A * | 7/1980 | Patmore | ............... | A01M 1/14 43/121 |
| 4,217,722 A * | 8/1980 | McMullen | ............... | A01M 1/14 43/121 |
| 4,286,713 A * | 9/1981 | Marchais | ............... | B65D 43/022 206/508 |
| 4,395,842 A * | 8/1983 | Margulies | ............... | A01M 1/14 43/121 |
| 4,709,503 A * | 12/1987 | McQueen | ............... | A01M 1/14 43/121 |
| 4,709,504 A * | 12/1987 | Andric | ............... | A01M 1/14 43/121 |
| 4,815,231 A * | 3/1989 | McQueen | ............... | A01M 1/14 43/121 |
| 4,819,371 A * | 4/1989 | Cohen | ............... | A01M 1/2011 43/131 |
| 5,172,514 A * | 12/1992 | Weber | ............... | A01M 1/02 43/132.1 |
| 5,238,681 A * | 8/1993 | Chang | ............... | A01N 25/34 43/132.1 |
| 5,303,501 A * | 4/1994 | Seemann | ............... | A01M 1/026 434/428 |
| 5,310,552 A * | 5/1994 | Gunner | ............... | A01N 63/30 43/132.1 |
| 5,427,266 A * | 6/1995 | Yun | ............... | B65D 25/54 220/780 |
| 5,427,784 A * | 6/1995 | Gunner | ............... | A01N 63/30 43/132.1 |
| 5,438,792 A * | 8/1995 | Monett | ............... | A01M 1/14 43/121 |
| 5,454,186 A * | 10/1995 | Gang | ............... | A01M 1/02 43/114 |
| 5,572,825 A * | 11/1996 | Gehret | ............... | A01M 1/14 229/120.11 |
| 5,771,628 A * | 6/1998 | Nobbs | ............... | A01M 1/2011 43/132.1 |
| 5,868,268 A * | 2/1999 | Walker | ............... | B65D 55/16 220/802 |
| 5,930,944 A * | 8/1999 | Knuppel | ............... | A01M 31/002 43/121 |
| 5,979,108 A * | 11/1999 | Adams | ............... | A01M 1/2011 43/131 |
| 6,389,738 B1 * | 5/2002 | Denny | ............... | A01M 1/2011 43/58 |
| 6,618,983 B1 * | 9/2003 | Spragins | ............... | A01M 1/2016 43/132.1 |
| 7,017,775 B2 * | 3/2006 | Zettle | ............... | B65D 43/021 206/508 |
| 7,299,587 B1 * | 11/2007 | Metcalfe | ............... | A01M 1/14 43/107 |
| 7,823,746 B1 * | 11/2010 | McCumber | ............... | B65D 43/0208 426/106 |
| 8,381,946 B2 * | 2/2013 | Everson | ............... | B65D 43/162 220/837 |
| 8,418,871 B1 * | 4/2013 | LaMasney | ............... | B65D 1/34 220/802 |
| 8,985,386 B2 * | 3/2015 | Everson | ............... | B65D 43/162 220/839 |
| 11,344,021 B1 * | 5/2022 | Suteerawanit | ............... | A01M 1/103 |
| 2002/0104255 A1 * | 8/2002 | Hobson | ............... | A01M 1/14 43/114 |
| 2002/0104846 A1 * | 8/2002 | Rosenfeld | ............... | B65D 1/10 206/508 |
| 2003/0155365 A1 * | 8/2003 | Llorente Lecue | ............... | B65D 81/34 220/802 |
| 2004/0251257 A1 * | 12/2004 | Schultz | ............... | B65D 81/3453 220/366.1 |
| 2005/0102889 A1 * | 5/2005 | Hoyes | ............... | A01M 1/026 43/114 |
| 2005/0160659 A1 * | 7/2005 | Forehand | ............... | A01M 1/106 43/107 |
| 2006/0053682 A1 * | 3/2006 | Goldstein | ............... | A01M 23/08 43/67 |
| 2006/0283075 A1 * | 12/2006 | Feldhege | ............... | A01M 1/14 43/121 |
| 2007/0107297 A1 * | 5/2007 | Wijenberg | ............... | A01M 1/026 43/107 |
| 2010/0011655 A1 * | 1/2010 | Frisch | ............... | A01M 1/14 43/114 |
| 2014/0220859 A1 * | 8/2014 | McCutchan | ............... | A01M 1/02 119/416 |
| 2015/0021321 A1 * | 1/2015 | Gosen | ............... | B65D 21/0204 220/802 |
| 2016/0106087 A1 * | 4/2016 | Ng | ............... | A01M 1/14 43/114 |
| 2017/0013821 A1 * | 1/2017 | Brown | ............... | A01M 1/14 |
| 2017/0215402 A1 * | 8/2017 | Bertrand | ............... | A01M 1/12 |
| 2017/0245488 A1 * | 8/2017 | Zhang | ............... | A23K 20/10 |
| 2018/0077917 A1 * | 3/2018 | Mailleux | ............... | A01M 1/14 |
| 2018/0184635 A1 * | 7/2018 | Studer | ............... | A01M 1/04 |
| 2020/0214279 A1 * | 7/2020 | Tsai | ............... | G06V 10/143 |
| 2020/0245605 A1 * | 8/2020 | Vickery | ............... | A01M 1/14 |
| 2021/0169060 A1 * | 6/2021 | Spangler | ............... | A01M 1/02 |
| 2021/0259231 A1 * | 8/2021 | Akiba | ............... | A01M 1/103 |
| 2022/0192173 A1 * | 6/2022 | Warthen | ............... | A01M 1/14 |
| 2022/0386585 A1 * | 12/2022 | Mailleux | ............... | A01N 25/18 |

FOREIGN PATENT DOCUMENTS

| | | | |
|---|---|---|---|
| DE | 29507823 U1 * | 4/1996 | |
| EP | 0281744 A2 * | 9/1988 | |
| JP | 2007159521 A * | 6/2007 | |
| JP | 3155614 U * | 11/2009 | |
| JP | 5574355 B1 * | 8/2014 | |
| JP | 2015139412 A * | 8/2015 | |
| JP | 6309135 B1 * | 4/2018 | |
| JP | 6383026 B2 * | 8/2018 | |
| JP | 2018121566 A * | 8/2018 | |
| JP | 6430725 B2 * | 11/2018 | |
| JP | 2018174812 A * | 11/2018 | |
| JP | 2018198589 A * | 12/2018 | |
| JP | 2019013209 A * | 1/2019 | |
| JP | 2019083801 A * | 6/2019 | |
| JP | 2019126288 A * | 8/2019 | |
| JP | 2019170203 A * | 10/2019 | |
| JP | 2019170204 A * | 10/2019 | |
| JP | 2020110072 A * | 7/2020 | |
| JP | 2020115819 A * | 8/2020 | |
| JP | 2020171268 A * | 10/2020 | |
| JP | 2021114922 A * | 8/2021 | |
| KR | 20030021227 A * | 3/2003 | |
| KR | 200421240 Y1 * | 7/2006 | |
| KR | 20080098275 A * | 11/2008 | |
| KR | 20080100721 A * | 11/2008 | |
| KR | 20080100722 A * | 11/2008 | |
| KR | 100871428 B1 * | 12/2008 | |
| KR | 20090012801 A * | 2/2009 | |
| KR | 20090032253 A * | 4/2009 | |
| KR | 20090056761 A * | 6/2009 | |
| KR | 20090008154 U * | 8/2009 | |
| KR | 20100007491 A * | 1/2010 | |
| KR | 20100002340 U * | 3/2010 | |
| RU | 2131188 C1 * | 6/1999 | |
| WO | WO-9622684 A1 * | 8/1996 | ............... A01M 1/02 |
| WO | WO-9811775 A1 * | 3/1998 | ............... A01M 1/2005 |
| WO | WO-02056679 A2 * | 7/2002 | ............... A01M 1/14 |

(56) References Cited

FOREIGN PATENT DOCUMENTS

| | | | | |
|---|---|---|---|---|
| WO | WO-2004098279 A2 | * | 11/2004 | |
| WO | WO-2007059075 A1 | * | 5/2007 | ............ A01M 1/02 |
| WO | WO-2015129976 A1 | * | 9/2015 | |
| WO | WO-2019181881 A1 | * | 9/2019 | |
| WO | WO-2019198931 A1 | * | 10/2019 | |
| WO | WO-2020009032 A1 | * | 1/2020 | ............ A01M 1/02 |

* cited by examiner

GERMAN COCKROACH GLUE TRAP

BACKGROUND OF THE INVENTION

The present invention relates to insect control and in particular to German cockroach control.

German cockroaches are attracted by heat and humidity. German cockroaches prefer a temperature of 85° to 95° F. with a humidity of 90 to 95% (although they do quite well at normal room temperatures and humidity also). German cockroaches will be concentrated within a given room where the temperature or humidity is highest, such as above refrigerators and other heat-generating equipment, under the sink, and around water pipes.

German cockroaches are a significant problem in the United States, Canada, and other countries where they tend to infest food preparation establishments, kitchens, and bathrooms. They are small, about one half inch long, are tan to nearly black in color, and have wings but do not fly. The German cockroaches may be difficult to identify because the hide in dark areas, but may be identified by the presence of their fecal matter which looks like pepper/coffee grounds. A significant problem is that German cockroaches reproduce at a very high rate, and adult females can produce from four to eight egg capsules in their lifetime. Each capsule contains 30-48 eggs.

Because German cockroaches have been found to carry *Salmonella*, which may cause food poisoning, they are a significant problem. German cockroach skins and droppings can also trigger an allergic reaction in people with asthma or other sensitivities. The discovery of German cockroaches in a restaurant may cause health code issues, and a loss of customers.

Glue traps have been developed and have provided some success. For example, U.S. Pat. No. 4,709,503 filed by McQueen, discloses a trap having small elliptical openings into the trap and a sticky surface inside the trap to capture insects. The openings are between 1/16 and 1/8 inches in diameter (too small for German cockroaches) and about one opening diameter above the floor. Unfortunately insects like a German cockroach can step into the trap, feel the sticky surface, and escape before being trapped. The openings are also only slightly below ceilings of each layer, allowing German cockroaches to cling to the ceilings, avoiding the glue. Other glue traps have larger than necessary openings allowing in significant light, thereby not providing a dark interior region preferred by the German cockroaches.

Because known insect traps fail to adequately capture German cockroach, there is a need for a better German cockroach trap.

BRIEF SUMMARY OF THE INVENTION

The present invention addresses the above and other needs by providing a German cockroach glue trap with openings large enough for German cockroaches to enter, but limiting light entering the trap. The openings are elevated above the floor to prevent the German cockroaches from feeling the glue before entering the trap. A trap ceiling is high enough above the openings to prevent the German cockroaches from clinging to the ceiling upon entering the trap.

In accordance with one aspect of the invention, there is provided a German cockroach glue trap having openings large enough for German cockroaches to enter but not too large to let in too much light. German cockroaches prefer dark areas, and limiting the amount of light entering the trap attracts the German cockroaches. For example an opening diameter between 3.5 mm and 4.5 mm, and preferably 4 mm, allows the German cockroaches to enter but limits light entering the trap.

In accordance with another aspect of the invention, there is provided a German cockroach glue trap having openings high enough to cause the German cockroaches to fall onto the glue upon entering the trap, making it more likely to stick to the glue. The centers of the openings have heights between 7 mm and 9 mm, and preferably 8 mm above the floor.

In accordance with still another aspect of the invention, there is provided a German cockroach glue trap having a ceiling high enough above the openings to prevent or limit the German cockroaches immediately clinging to the ceiling upon entering the trap. The ceiling is at least 12 mm above the center of the openings, and is preferably between 12 mm and 30 mm above the center of the openings, and more preferably 17 mm above the center of the openings.

In accordance with yet another aspect of the invention, there is provided a German cockroach glue trap having the benefits of 1) no chemical involvement, which is safe for pets and children; 2) simple application: peel the paper out of the top of the glue, add bait, put a cap on the top, and place it in the infested location; and 3) inexpensive.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement, or typically within 10 percent of a stated value.

Figure 1A:
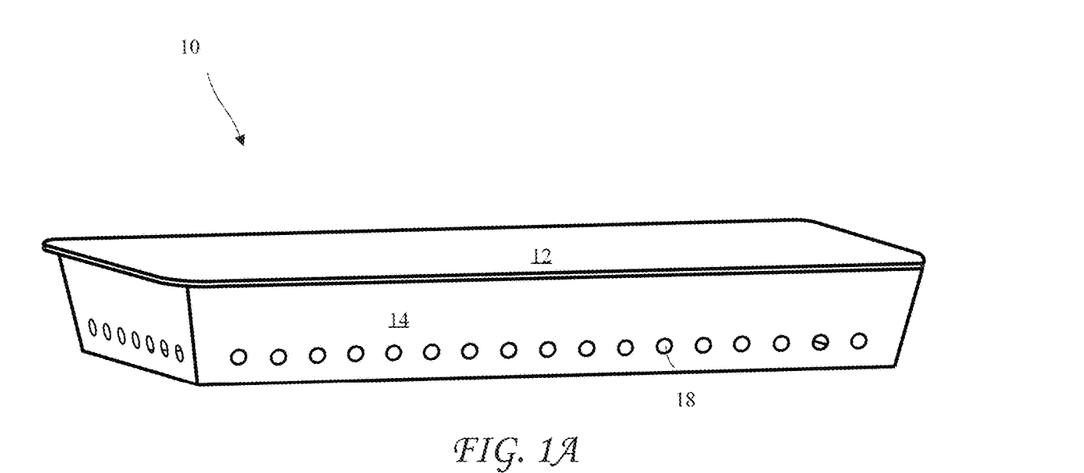
FIG. 1A is a perspective view of a glue trap according to the present invention.
Figure 1B:
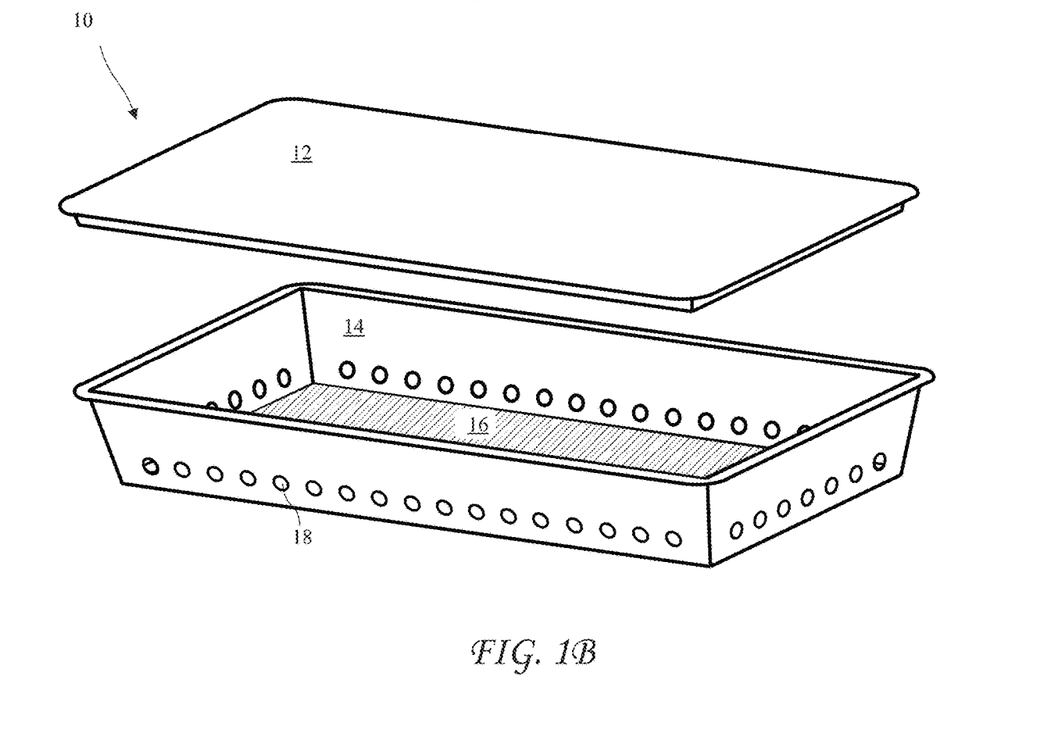
FIG. 1B is an exploded view of the glue trap according to the present invention.

A perspective view of a glue trap 10 is shown in FIG. 1A and an exploded view of the glue trap 10 is shown in FIG. 1B. The glue trap 10 comprising a base 14 and a lid 12. The base 14 includes openings 18 allowing German cockroaches to enter the trap 10. The base 14 is tapered for improved storage and delivery.

Figure 2A:
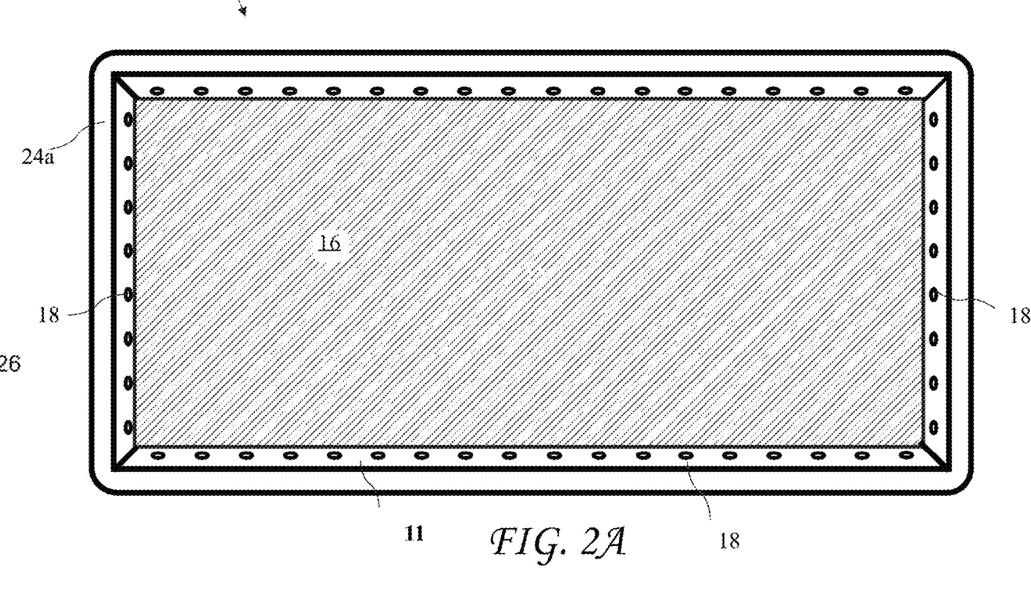
FIG. 2A is a top view of a base of the glue trap according to the present invention.
Figure 2B:
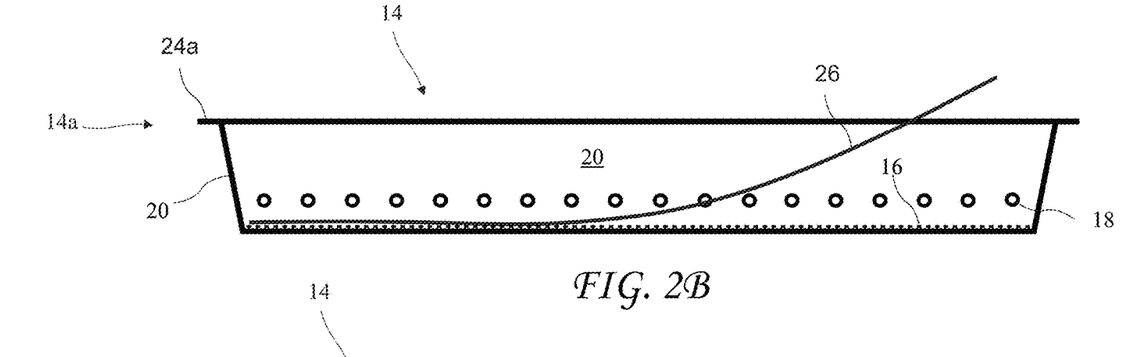
FIG. 2B is a side view of the base of the glue trap according to the present invention.
Figure 2C:
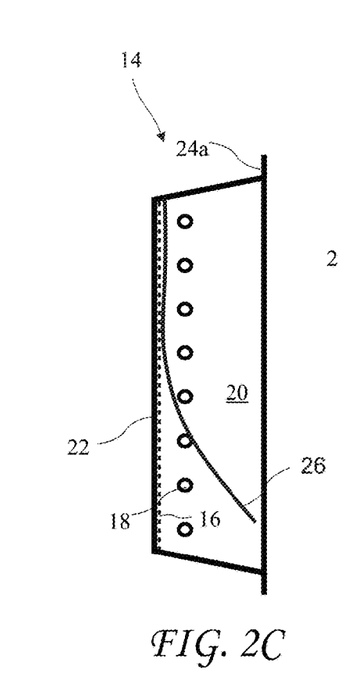
FIG. 2C is an end view of the base of the glue trap according to the present invention.

A top view of the base 14 of the glue trap 10 is shown in FIG. 2A, a side view of the base 14 is shown in FIG. 2B, and an end view of the base 14 is shown in FIG. 2C. The base 14 includes a base top 14a. A glue layer 16 covers a top surface of a floor 22 of the base 14. Preferably, a removable cover sheet 26 resides over the glue layer 16. The openings 18 are in side walls 20 of the base 14. An outward reaching top rim 24a of the base 14 resides at the top of the side walls 20.

Figures 3A, 3C:
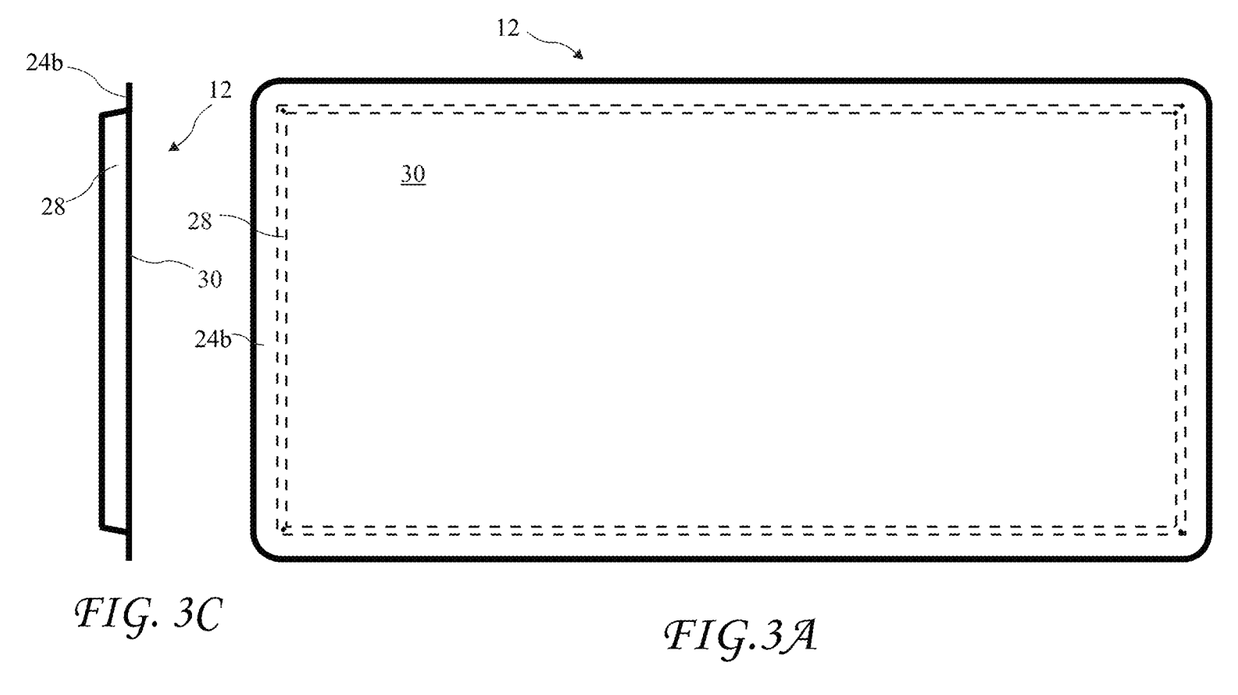
FIG. 3A is a top view of a lid of the glue trap according to the present invention.
FIG. 3C is an end view of the lid of the glue trap according to the present invention.
Figure 3B:
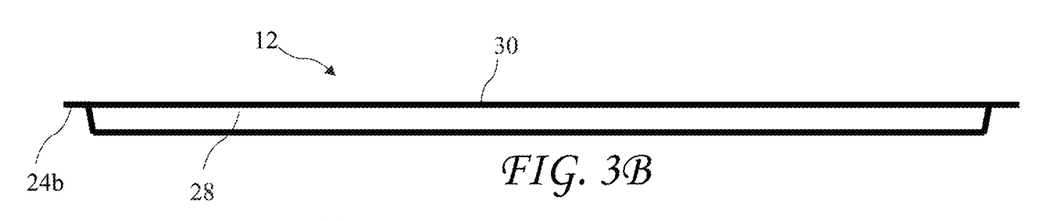
FIG. 3B is a side view of the lid of the glue trap according to the present invention.

A top view of the lid 12 of the glue trap 10 is shown in FIG. 3A, a side view of the lid 12 is shown in FIG. 3B, and an end view of lid 12 is shown in FIG. 3C. The lid 12 includes a lid rim 24b surrounding an insert 28 which engages the base 14. The lid 12 includes a top surface (or ceiling) 30.

Figure 4A:
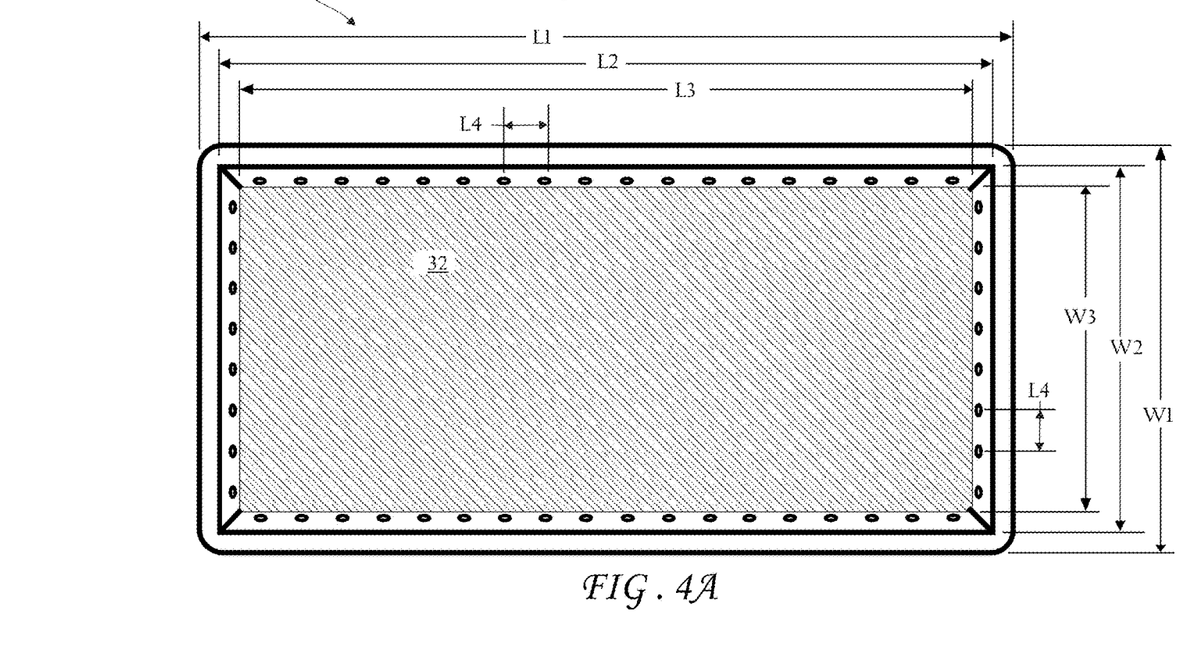
FIG. 4A is a dimensioned top view of the base of the glue trap according to the present invention.
Figure 4B:
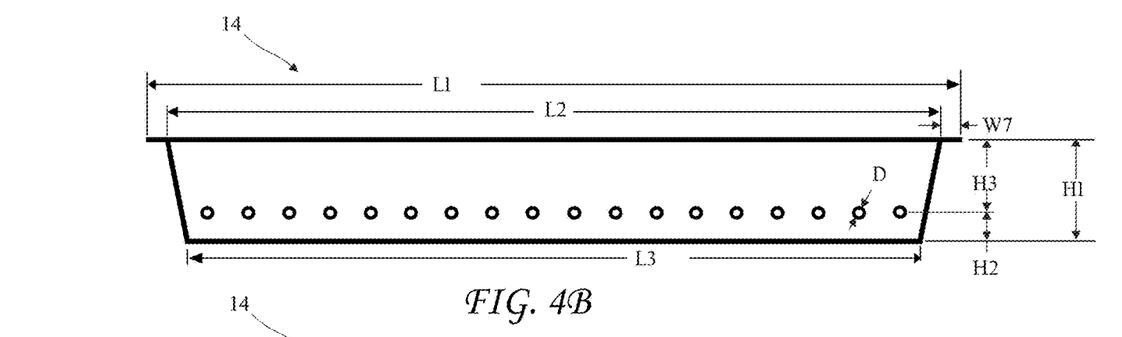
FIG. 4B is a dimensioned side view of the base of the glue trap according to the present invention.

A dimensioned top view of the base 14 is shown in FIG. 4A and dimensioned side view of the base 14 is shown in FIG. 4B. The base 14 including flange 24a has an overall length L1, overall width W1 and an overall height H1. An interior 32 of the base 14 has a top length L2 and a top width W2, a bottom length L3, and bottom width W3. The openings 18 have a diameter D and are laterally spaced apart by a length L4 and are preferably at the same height. The flange 24a reached a width W7 out from the base 24.

The length L1 is preferably between 100 mm and 300 mm, and more preferably about 200 mm, and most preferably is 200 mm. The length L2 is preferably between 90 mm and 290 mm and more preferably about 190 mm, and most preferably is 190 mm. The length L3 is preferably between 80 mm and 280 mm, and more preferably is about 180 mm, and most preferably is 180 mm. The length L4 is preferably between 5 mm and 20 mm, and more preferably is about 10 mm, and most preferably is 10 mm. Further, the length L2 is preferably 10 mm less than the length L1, and the length L3 is preferably 10 mm less than the length L2.

The width W1 is preferably between 50 mm and 150 mm, and more preferably is about 100 mm, and most preferably is 100 mm. The width W2 is preferably between 40 mm and 140 mm, and more preferably is about 90 mm, and most preferably is 90 mm. The width W3 is preferably between 30 mm and 130 mm, and more preferably is about 80 mm, and most preferably is 80 mm. The height H1 is preferably between 15 mm and 30 mm, and more preferably is about 25 mm and most preferably is 25 mm. Further, the width W2 preferably is 10 mm less than the width W1, and the width W3 preferably is 10 mm less than the width W2.

The diameter D is preferably between 3.5 mm and 5 mm and more about 4 mm and most preferably is 4 mm. The width W7 is preferably between 3 mm and 7 mm, and more preferably about 5 mm, and most preferably is 5 mm.

The width of adult German cockroaches is about 4 mm, and the width of a nymph is about 3.5 mm. It is important to have the smallest diameter D opening 18 for the German cockroaches to enter the glue trap 10 because the German cockroaches like small cracks and crevices which make German cockroaches feel safe for hiding and for breeding. The diameter D of the openings 18 allows the German cockroaches to enter the glue trap 10 while providing a darker interior. German cockroaches are nocturnal insects that prefer dark environments making them more likely to enter the dark interior.

Centers of openings 18 have heights H2 above the floor 22. The height H2 is preferably between 7 mm and 9 mm, more preferably about 8 mm, and most preferably 8 mm. The height H2 of the openings 18 is important because if the openings 18 are too low, the first German cockroaches to enter the glue trap 10 may immediately contact the glue with front legs before completely entering the glue trap 10 and block the openings 18, preventing additional German cockroaches from entering the glue trap 10.

The ceiling 30 has a height H3 above the centers of the openings 18. The height H3 is at least 12 mm, and preferably between 12 mm and 30 mm, more preferably about 17 mm, and most preferably is 17 mm above the center of the openings. If the openings 18 are too close to the ceiling 30, some of the German cockroaches, after entering, may crawl upwards towards the ceiling 30 and stay on the ceiling 30. It is important to catch the German cockroach as soon as possible because German cockroaches are drawn to the smell of German cockroach feces of trapped German cockroaches.

Figure 5A:
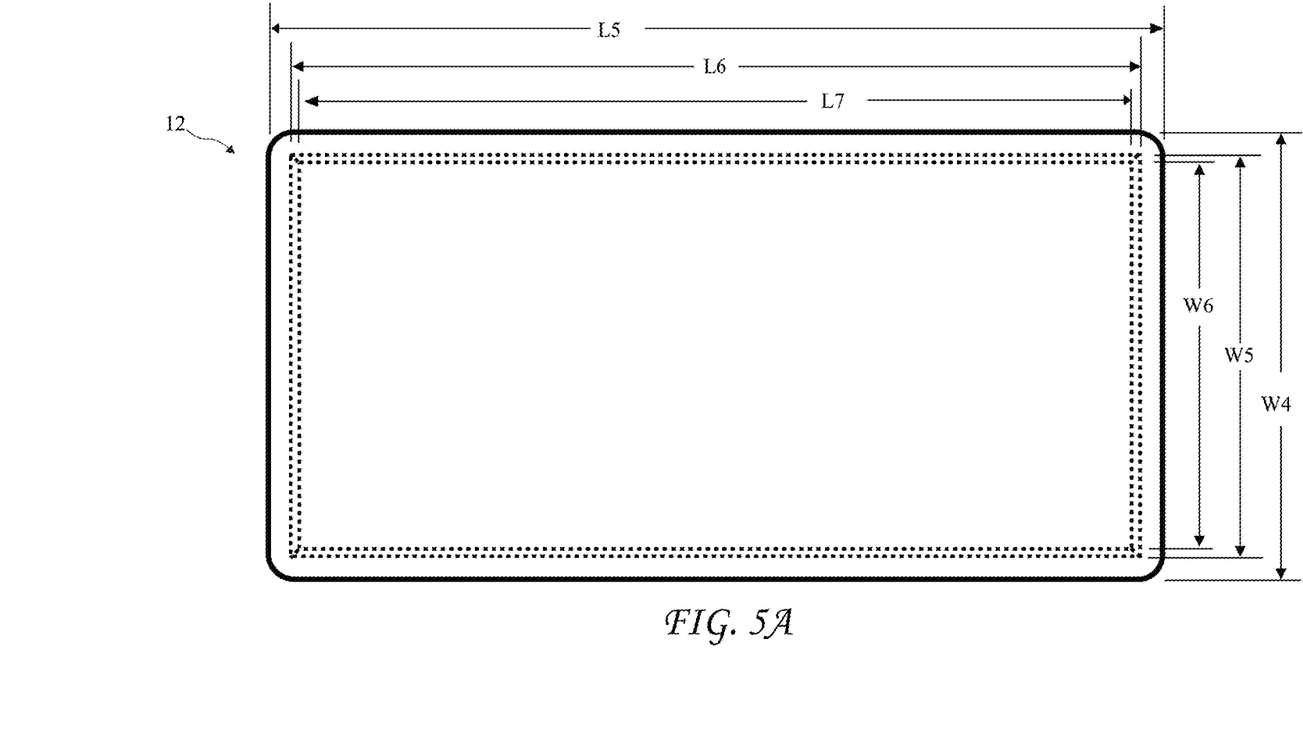
FIG. 5A is a dimensioned top view of the lid of the glue trap according to the present invention.
Figure 5B:
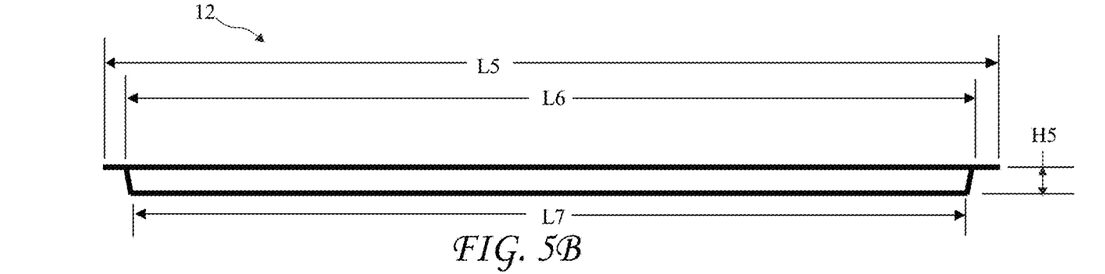
FIG. 5B is a dimensioned side view of the lid of the glue trap according to the present invention.

A dimensioned top view of the lid 12 of the glue trap 10 is shown in FIG. 5A and a dimensioned side view of the lid 12 is shown in FIG. 5B. The lid 12 has an overall length L5 and overall width W4. The insert 28 has a top length L6 top width W5, a bottom length L7 and bottom width W6, and a height H5. The length L5 is preferably about 200 mm and more preferably is 200 mm. The width W4 is preferably about 100 mm and more preferably is 100 mm. The length L6 is preferably about 190 mm and more preferably is 190 mm. The width W4 is preferably about 100 mm and more preferably is 100 mm. The length L7 is preferably about 188 mm and more preferably is 188 mm. The width W4 is preferably about 88 mm and more preferably is 88 mm. The height H5 is preferably about 5 mm and more preferably is 5 mm.

The insert 28 is angled in relation to the side walls 20 preferably providing a tight seal between the lid 12 and the base 14.

The color of the glue trap 10 is preferably black, brown, blue, or a dark color. Nocturnal insects like the German cockroach prefer dark and small cracks and crevices for harborage.

While the invention herein disclosed has been described by means of specific embodiments and applications thereof, numerous modifications and variations could be made thereto by those skilled in the art without departing from the scope of the invention set forth in the claims.

I claim:

1. A German cockroach glue trap comprising:
    a base having an overall length between 100 mm and 300 mm, an overall width between 50 mm and 150 mm, and an overall height between 15 mm and 30 mm;
    a base floor of the base;
    a base top opposite to the base floor;
    a base interior between the base floor and the base top;
    a base flange surrounding the base top, the base flange reaching 5 mm out from the base interior;
    four side walls of the base, the side walls tapering smaller from the base top to the base floor;

a plurality of openings in the side walls, the opening have a diameter of 4 mm and residing 8 mm above the base floor and between 12 mm and 30 mm below the base top;
a glue layer on the base floor;
a removable glue cover sheet residing on the glue layer before use;
a lid configured to attach to the base top; and
the lid including an insert insertable into the base top.

2. A German cockroach glue trap comprising:
a base having an overall length of 200 mm, and overall width of 100 mm, and a height of 25 mm;
a base floor of the base;
a base top opposite to the base floor;
a base interior having a first length of 190 mm at the base top and a second length of 180 mm at the base floor and a first width of 90 mm at the base top and a second width of 80 mm at the base floor;
a base flange surrounding the base top, the base flange reaching 5 mm out from the base interior;
four side walls of the base, the side walls tapering smaller from the base top to the base floor;
a plurality of openings in the side walls, the opening have a diameter of 4 mm and residing 8 mm above the base floor and between 12 mm and 30 mm below the base top;
a removable and replaceable glue layer on the base floor;
a removable glue cover sheet residing on the glue layer before use;
a lid configured to attach to the base top; and
the lid including an insert insertable into the base top.

\* \* \* \* \*